United States Patent
Narimatsu

(10) Patent No.: US 7,075,622 B2
(45) Date of Patent: Jul. 11, 2006

(54) PROJECTION LENS AND OPTICAL PROJECTOR PROVIDED WITH THE SAME

(75) Inventor: Shuji Narimatsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 10/725,409

(22) Filed: Dec. 3, 2003

(65) Prior Publication Data

US 2004/0160589 A1 Aug. 19, 2004

(30) Foreign Application Priority Data

Dec. 6, 2002 (JP) .............................. 2002-354978

(51) Int. Cl.
*G03B 27/54* (2006.01)
*G03B 27/52* (2006.01)
*G02B 9/62* (2006.01)

(52) U.S. Cl. ........................... 355/67; 355/55; 359/761; 359/663

(58) Field of Classification Search ................ 359/690, 359/647, 658, 663, 770, 761, 649–651, 642–643; 355/55, 53, 67

See application file for complete search history.

(56) References Cited

U.S. PATENT DOCUMENTS

| 5,946,144 A | * | 8/1999 | Yamamoto | 359/742 |
| 2002/0176058 A1 | * | 11/2002 | Yasui et al. | 353/100 |
| 2004/0051964 A1 | * | 3/2004 | Endo et al. | 359/692 |

FOREIGN PATENT DOCUMENTS

JP    A 2000-137165    5/2000

* cited by examiner

*Primary Examiner*—W. B. Perkey
*Assistant Examiner*—Kevin Gutierrez
(74) *Attorney, Agent, or Firm*—Oliff & Berridge, PLC.

(57) ABSTRACT

A fixed-focus projection lens 2 comprises practically six lenses; a single lens having negative refracting power serving as a first lens 10, a single lens having positive refracting power serving as a second lens 20, a single lens having negative refracting power serving as a third lens 30, a compound lens having positive refracting power, consisting of a first component lens 41 and a second component lens 42, and serving as a fourth lens 40, and a single lens having positive refracting power serving as a fifth lens 50, arranged in that order from the side of a screen toward a display device. A surface 11, on the side of the display device, of the first lens 10, and a surface 41, on the side of the display device, of the second component lens 42 of the fourth lens 40 are aspherical.

6 Claims, 5 Drawing Sheets aa.lis

```
              RDY          THI        RMD       GLA
OBJ:       INFINITY     1800.000000
  1:       114.54700       2.000000             1.51680-64.2
  2:        13.20900      27.700000
  ASP:
   K   :  -0.221466

A   : -.210252E-04   B : -.176060E-06   C : 0.877720E-09   D : -.554803E-11

3:        27.94100       5.000000             1.83400-37.3
  4:      -147.91100       0.200000
  5:       INFINITY       11.400000
  6:       -26.95600       1.000000             1.80518-25.5
  7:       248.41000       4.900000
  8:    -97865.71700       1.000000             1.76182-26.6
  9:        18.68700       6.200000             1.69350-53.3
 10:       -42.39400       4.250000
  ASP:
   K   :   0.533605

A   : 0.291050E-04   B : 0.632345E-07   C : 0.111812E-10   D : 0.200219E-12

11:        88.28100       8.200000             1.71300-53.9
 12:       -26.66300       1.000000
 13:       INFINITY       23.000000             1.51680-64.2
 14:       INFINITY
IMG:
```

PROJECTION LENS AND OPTICAL PROJECTOR PROVIDED WITH THE SAME

BACKGROUND OF THE INVENTION

1. Field of the Invention

The present invention relates to a projection lens and an optical projector provided with the same for projecting an image formed on a slide, a film or a glass plate or an image displayed by a liquid crystal display in an enlarged image on a screen.

2. Description of the Related Art

A projection lens for a low-cost LCD projector is required to have a small f-number, to be compact and lightweight, to be capable of forming an image having high definition and low distortion, to cause a small chromatic aberration of magnification, to be telecentric, to have a long back focal distance and a short projection distance, and to be inexpensive.

As mentioned in JP2000-137165A, projection optical systems of most optical projectors that project an image formed on a film or a slide, or an image formed by a liquid crystal display in an enlarged view on a screen employ a telecentric zoom lens. However, most zoom lenses are costly.

Requirements for forming high-definition images with low distortion and low chromatic aberration of magnification can be satisfied by a fixed focus projection lens consisting of a plurality of lenses. However, the plurality of lenses increases the internal absorbance of light waves of short wavelengths and hence the transmittance of the projection lens is small. Although a projection lens having an acceptable f-number can be constructed by assembling lenses of lead glass having low internal absorbance with light waves of short wavelengths, such a projection lens, however, is expensive.

SUMMARY OF THE INVENTION

Accordingly, it is an object of the present invention to solve the problems in the conventional projection lenses and to provide a fixed-focus projection lens of simple construction consisting of a small number of lenses, scarcely causing aberrations, and to provide an optical projector provided with such a fixed-focus projection lens.

According to the present invention, a projection lens comprises: six lenses including a single lens having negative refracting power serving as a first lens, a single lens having positive refracting power serving as a second lens, a single lens having negative refracting power serving as a third lens, a compound lens having positive refracting power, consisting of a first component lens having negative refracting power and a second component lens having positive refracting power and cemented to the first component lens, and serving as a fourth lens, and a single lens having positive refracting power serving as a fifth lens, arranged in that order from the side of a screen toward a display device; wherein a part of the projection lens on the side of the display device is substantially telecentric, and a surface, on the side of the display device, of the first lens, and a surface, on the side of the display device, of the second component lens are aspherical.

According to the present invention, the first lens condenses light rays coming from directions in a wide angular range, the second lens converges the light rays, the third lens diffuses the light rays converged by the second lens, the fourth lens receives the light rays diffused by the third lens and reduces chromatic aberration, and the fifth lens receives the light rays from the fourth lens and converges the light rays in a substantially telecentric mode on the side of the display device.

Since the surface, on the side of the display device, of the first lens is aspherical, optical aberrations including distortion, coma and astigmatism can be reduced even though the light rays from the side of the screen fall on the first lens in a large angular range and the projection lens consists of a comparatively small number of lenses. Since the surface, on the side of the display device, of the second component lens is aspherical, optical aberrations including distortion, coma and astigmatism can be reduced even though the projection lens consists of a comparatively small number of lenses, and excessive load is not placed on the fifth lens to make the projection lens substantially telecentric.

Since one of the surfaces of the first lens, and one of the surfaces of the fourth lens are aspherical, it is disadvantageous to form the first and the fourth lens in effective diameters from the viewpoint of manufacturing cost. However, since the third lens is interposed between the second and the fourth lens, a bundle of rays of a big diameter can be transmitted by the third lens without causing large aberration to the fourth lens by disposing the second, the third and the fourth lens in a proper positional relation, and by using a lens having a proper refracting power as the third lens even if the effective diameters of the first and the fourth lens are limited. Thus, the projection lens has a small f-number for the number of the constituent lenses.

Since the third lens is interposed between the second and the fourth lens, light rays parallel to the optical axis of the projection lens coming from the side of the screen and fallen on the first lens can be made to fall on the fourth lens in light rays substantially parallel to the optical axis by disposing the second, the third and the fourth lens in a proper positional relation. Consequently, optical load for reducing aberrations other than chromatic aberration on the fourth lens can be reduced.

In the projection lens according to the present invention, $0.3 < L_{23}/L_{2-4} < 0.5$, where $L_{2-4}$ is the distance between an end, on the side of the screen, of the second lens and an end, on the side of the display device, of the fourth lens, and $L_{23}$ is the distance between an end, on the side of the display device, of the second lens and an end, on the side of the screen, of the third lens.

In the projection lens according to the present invention, the smaller the ratio: $L_{23}/L_{2-4}$, the closer is the third lens to the second lens, and hence the greater is the diameter of a bundle of rays leaving the second lens and falling on the third lens. When the diameter of the bundle of rays falling on the third lens is big, and the third lens has a large power, the effective diameter of the fourth lens must be big to receive a bundle of rays of a big diameter for a desired f-number. Since the effective diameter of the fourth lens having the aspherical surface is limited, the power of the third lens must be small for a desired f-number. However, it is undesirable to reduce the power of the third lens excessively because the reduction of the power of the third lens shortens the back focal distance of the projection lens. Thus, the there is a limit to the reduction of the power of the third lens. Thus, it is disadvantageous to decrease the ratio: $L_{23}/L_{2-4}$ excessively when the fourth lens has a limited effective diameter and a desired back focal distance must be secured. Numerical experiments showed that the ratio must be 0.3 or above.

The greater the ratio: $L_{23}/L_{2-4}$, the longer is the distance between the second and the third lens and the shorter is the distance between the third and the fourth lens. To construct a projection lens having a desired f-number, all the light rays leaving the third lens must enter the fourth lens and hence the third lens must have a large power. The greater the ratio: $L_{23}/L_{2-4}$, the greater the power of the third lens must be. However, aberration is liable to occur if the power of the third lens is excessively large. Therefore, the power of the third lens must be limited so that aberration is within an allowable range, and the ratio: $L_{23}/L_{2-4}$ must not be excessively large. Numerical experiments showed that the ratio must be 0.5 or below.

In the projection lens according to the present invention, the first, the second and the third lens meet a condition: $-1.5 < f_{1-2}/f_3 < -0.8$, where $f_{1-2}$ is the synthetic focal length of the first and the second lens, and $f_3$ is the focal length of the third lens.

When $f_{1-2}/f_3$ is greater than $-1.5$ and smaller than $-0.8$, i.e., when $f_{1-2}/f_3$ is in the vicinity of $-1$, light rays traveling from the side of the screen and falling on the first lens substantially parallel to the optical axis emerge from the third lens substantially parallel to the optical axis and fall in substantially parallel light rays on the fourth lens. Light rays traveling from the side of the screen and fallen on the first lens obliquely to the optical axis emerge from the third lens and fall on the fourth lens without greatly changing the traveling direction. Thus, the set of the first and the second lens, and the third lens form the so-called afocal lens system, which reduces aberration attributable to the projection lens. When $f_{1-2}/f_3$ is $-1.5$ or below or $-0.8$ or above, light rays traveling from the side of the screen and fallen on the first lens substantially parallel to the optical axis fall obliquely on the fourth lens. Consequently, load for reducing aberration on the fourth lens increases, and the projection lens is liable to cause aberrations.

In the projection lens according to the present invention, the first, the second and the third lens have refractive powers such that light rays traveling from the side of the screen and falling on the first lens substantially parallel to the optical axis emerge from the third lens substantially parallel to the optical axis.

Since the set of the first and the second lens, and the third lens form the afocal lens system, aberrations attributable to the projection lens can be reduced.

In the projection lens according to the present invention, a surface, on the side of the screen, of the first component lens of the fourth lens is substantially flat.

Light rays leaving the third lens substantially parallel to the optical axis fall on the fourth lens being scarcely refracted by the surface, on the side of the screen, of the first component lens of the fourth lens, which reduces aberrations attributable to the projection lens.

An optical projector according to the present invention comprises: an image forming means for forming an image, and the aforesaid projection lens for projecting the image formed by the image forming means.

DESCRIPTION OF THE PREFERRED EMBODIMENTS

Figures 1, 2:
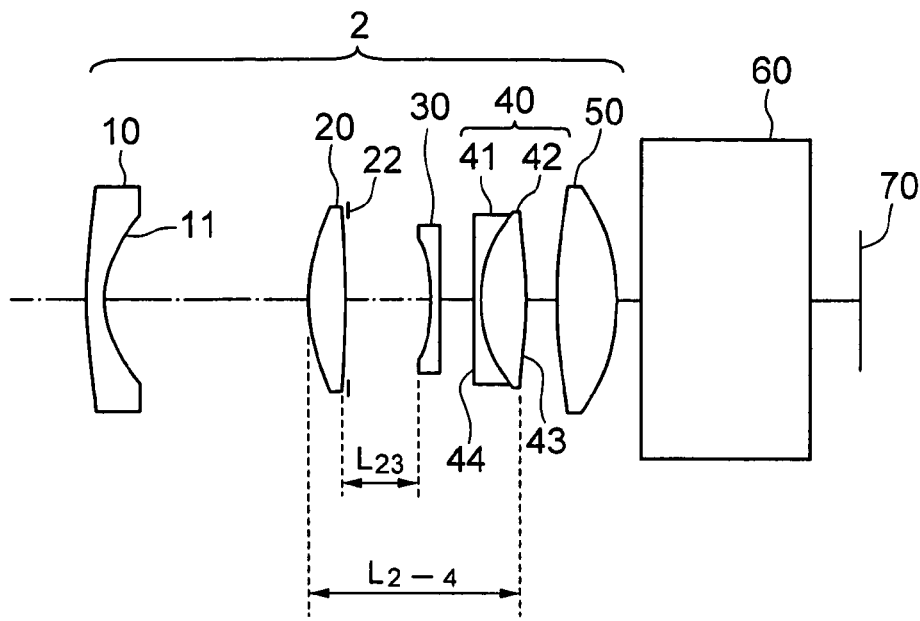
FIG. 1 is a view of a projection lens in a preferred embodiment according to the present invention, in which a screen is on the left side, and a display device (image plane) is on the right side.
FIG. 2 is a table showing data on the projection lens shown in FIG. 1, in which OBJ Nos. are plane numbers, RDYs are radii of curvature in millimeter, and THIs are thicknesses of lenses or air spaces.
Figure 6:
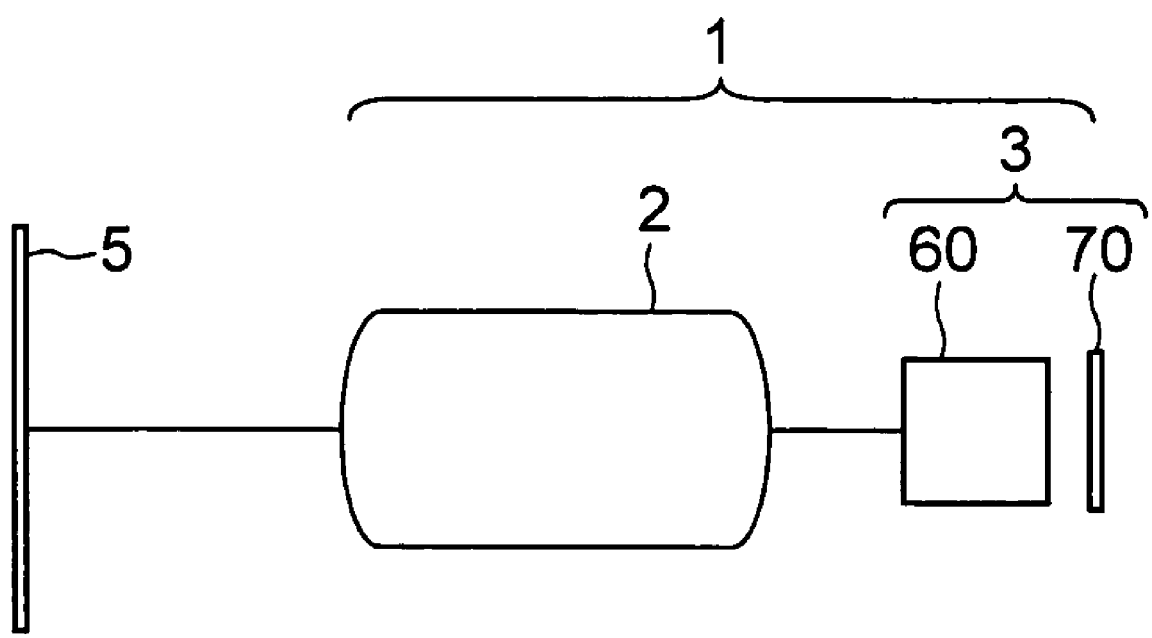
FIG. 6 is a diagrammatic view of an optical projector provided with a projection lens according to the present invention.

Referring to FIG. 1 showing a projection lens 2 in a preferred embodiment according to the present invention, the projection lens 2 comprises six lenses including a single lens having negative refracting power serving as a first lens 10, a single lens having positive refracting power serving as a second lens 20, a single lens having negative refracting power serving as a third lens 30, a compound lens having positive refracting power, consisting of a first component lens 41 having negative refracting power and a second component lens 42 having positive refracting power joined together, and serving as a fourth lens 40, and a single lens having positive refracting power serving as a fifth lens 50, arranged in that order from the side of a screen, i.e., the left side in FIG. 1, toward a display device (image plane) (the right side in FIG. 1). A synthesizing prism 60 synthesizes three color images formed by three liquid crystal displays. A line indicated at 70 typically represents a display device (image plane). The projection lens 2 is substantially telecentric on the side of the image plane 70. The projection lens 2 collimates light rays emitted by the image plane 70 so that the light rays travel in a bundle of parallel light rays toward a screen 5 (FIG. 6). A diaphragm 22 is disposed close to a surface, on the side of the display device 70, of the second lens 20 to determine the f-number of the projection lens 2.

Figure 5:
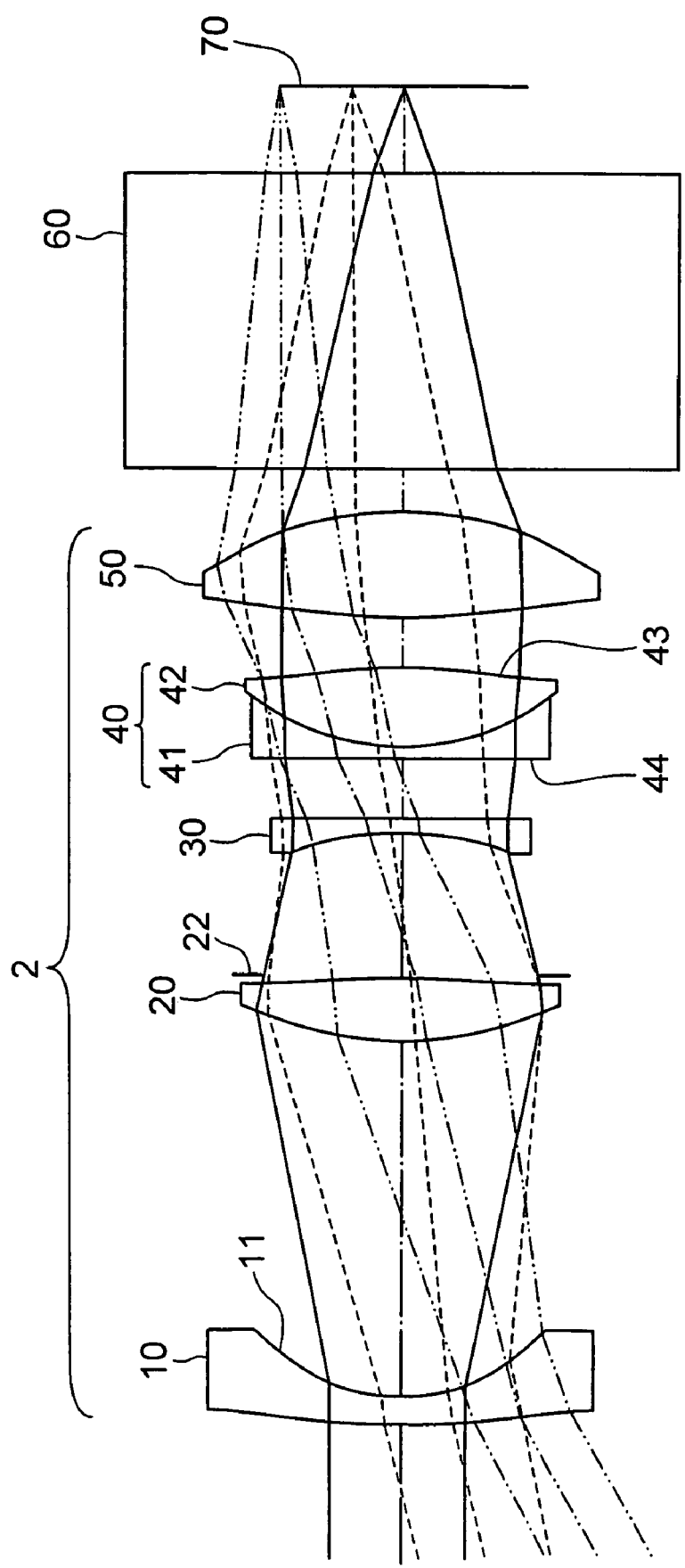
FIG. 5 is a diagrammatic view showing paths of light rays in a projection lens according to the present invention.

Referring to FIG. 5, the first lens 10 condenses light rays coming from directions in a wide angular range, the second lens 20 converges the light rays, the third lens 30 diffuses the light rays converged by the second lens 20, the fourth lens 40 receives the light rays diffused by the third lens 30 and reduces mainly chromatic aberration, and the fifth lens 50 receives the light rays from the fourth lens 40 and converges the light rays in a substantially telecentric mode on the side of the display device 70.

A surface 11, on the side of the display device 70, of the first lens 10, and a surface 43, on the side of the display device 70, of the second component lens 42 are aspherical. The aspherical shapes of the surfaces 11 and 43 are expressed by Expression (1).

$$x = \frac{Ry^2}{1+\sqrt{1-(1+K)R^2y^2}} + Ay^4 + By^6 + Cy^8 + Dy^{10} \quad (1)$$

where A, B, C and D are coefficients of predetermined values, R is the radius of curvature of a central part of the surface 11 or 43.

Since the surface 11 of the first lens 10 is aspherical, optical aberrations including distortion, coma and astigmatism can be reduced even though light rays coming from the side of the screen fall from directions in a wide angular range on the first lens 10 and the projection lens consists of a comparatively small number of lenses. Since the surface 43 of the second component lens 42 is aspherical, optical aberrations including distortion, coma and astigmatism can be reduced even though the projection lens 2 consists of a comparatively small number of lenses. Since the surface 43 is aspherical, excessive load is not placed on the fifth lens 50 to make the projection lens 2 substantially telecentric. Since the surfaces 11 and 43 are aspherical, optical aberrations including distortion coma and astigmatism and excluding chromatic aberration can be remarkably reduced. For example, optical aberration of 3.0% including distortion, coma and astigmatism caused by the conventional projection lens can be reduced to optical aberrations of about 1.5%.

Since one of the surfaces of the first lens 10, and one of the surfaces of the fourth lens 40 are aspherical, the manufacturing cost of the projection lens 2 increases if the first lens 10 and the fourth lens 40 are formed in effective diameters greater than predetermined effective diameters. When the aspherical surfaces 11 and 43 are formed by coating spherical surfaces of glass lenses with thin films of a resin or the like, respectively, possible effective diameters of the lenses are limited. Thus, the first lens 10 and the fourth lens 40 cannot be formed in very big effective diameters. The third lens 30 is interposed between the second lens 20 and the fourth lens 40 in order that the projection lens 2 has a small f-number for the number of the lenses, though the effective diameters of the first lens 10 and the fourth lens 40 are limited. A bundle of rays of a big diameter passed the second lens 20 can be properly transmitted by the third lens 30 to the fourth lens 40 by disposing the second lens 20, the third lens 30 and the fourth lens 40 in a proper positional relation, and by using a lens having a proper refracting power as the third lens 30 even if the effective diameters of the first lens 10 and the fourth lens 40 are limited. The power of the third lens 30 is determined properly to avoid causing large aberration by the third lens 30. Thus, the projection lens 2 has a high aberration-reducing characteristic, and a small f-number of 1.5 for the comparatively small number of the constituent lenses.

The projection lens 2 satisfies a condition expressed by Expression (2).

$$0.3 < L_{23}/L_{2\text{-}4} < 0.5 \quad (2)$$

where $L_{23}$ is the distance between the back end, i.e., an end on the side of the display device 70, of the second lens 20, and the front end, i.e., an end on the side of the screen 5, of the third lens 30, and $L_{2\text{-}4}$ is the distance between the front end, i.e., an end on the side of the screen 5, of the second lens 20, and the back end, i.e., an end on the side of the display device 70, of the fourth lens 40. The value of $L_{23}/L_{2\text{-}4}$ must be within such a range defined by Expression (2) for the following reasons.

As shown in FIGS. 1 and 5, the third lens 30 is closer to the second lens 20 and hence light rays emergent from the second lens 20 fall in a bundle of light rays of a bigger diameter on the third lens 3 when the value of $L_{23}/L_{2\text{-}4}$ is smaller. When the third lens 30 has a large power, light rays emergent from the third lens 30 are diffused further and the diffused light rays fall on the fourth lens 40. The effective diameter of the fourth lens 40 must be big to receive a bundle of light rays of a big diameter to obtain a desired f-number. Therefore, if the effective diameter of the fourth lens 40 having the aspherical surface 43 is limited, the power of the third lens 30 needs to be reduced to obtain a desired f-number. However, an excessively small power of the third lens 30 shortens the back focal distance of the projection lens 2 undesirably. Thus, there is a limit to the reduction of the power of the third lens 30 with $L_{23}/L_{2\text{-}4}$ kept in a small value. Therefore, when the effective diameter of the fourth lens 40 is limited and the projection lens 2 needs to have a desire back focal distance, it is disadvantageous to reduce the value of $L_{23}/L_{2\text{-}4}$ excessively. Numerical experiments showed that the value of $L_{23}/L_{2\text{-}4}$ must be greater than 0.3.

As shown in FIGS. 1 and 5, the third lens 30 is farther from the second lens 20, and closer to the fourth lens 40 when the value of $L_{23}/L_{2\text{-}4}$ is larger. All the light rays emergent from the third lens 30 must fall on the fourth lens 40 to obtain a desired f-number, and hence the third lens 30 must have a large power to diffuse the emergent light rays. Thus, the greater the value of $L_{23}/L_{2\text{-}4}$, the larger the power of the third lens 30 must be. However, the third lens 30 causes aberration when the power of the same is excessively large. Consequently, the power of the third lens 30 must bee limited so that aberration is within an allowable range, and the value of $L_{23}/L_{2\text{-}4}$ must not be excessively large. Numerical experiments showed that the value of $L_{23}/L_{2\text{-}4}$ must be smaller than 0.5.

The projection lens 2 meet a condition expressed by Expression (3).

$$-1.5 < f_{1\text{-}2}/f_3 < -0.8 \quad (3)$$

where $f_{1\text{-}2}$ is the synthetic focal distance of the first lens 10 and the second lens 20, and $f_3$ is the focal distance of the third lens 30.

The value of $f_{1\text{-}2}/f_3$ must be within such a range defined by Expression (3) for the following reasons. When $f_{1\text{-}2}/f_3$ is greater than −1.5 and smaller than −0.8, i.e., when $f_{1\text{-}2}/f_3$ is in the vicinity of −1, the synthetic power of the first lens 10 and the second lens 20 is approximately equal to the power of the third lens 30, and the synthetic power of the first lens 10 and the second lens 20 and the power of the third lens 30 have opposite signs, respectively. For example, light rays traveling from the side of the screen 5 and falling on the first lens 10 substantially parallel to the optical axis emerge from the third lens substantially parallel to the optical axis and fall in substantially parallel light rays on the fourth lens 40. Light rays traveling from the side of the screen 5 and fallen on the first lens 10 obliquely to the optical axis emerge from the third lens 30 and fall on the fourth lens 40 without greatly changing the traveling direction. Thus, the set of the first lens 10 and the second lens 20, and the third lens 30 form the so-called afocal lens system, which reduces aberration attributable to the projection lens 2 satisfactorily for the comparatively small number of the constituent lenses. When $f_{1\text{-}2}/f_3$ is −1.5 or below or −0.8 or above, the set of the first lens 10 and the second lens 20, and the third lens 30 are unable to form an afocal lens system and, consequently, light rays traveling from the side of the screen 5 and fallen on the first lens 10 substantially parallel to the optical axis fall obliquely on the fourth lens 40. Consequently, load for aberration correction on the fourth lens 40 increases, and the projection lens 2 is liable to cause aberration. Thus, the first lens 10, the second lens 20 and the third lens 30 of the projection lens 2 have refracting powers to make light rays coming from the side of the screen 5 and falling on the first lens 10 substantially parallel to the optical axis emerge from the third lens 30 substantially parallel to the optical axis.

A surface 44, on the side of the screen 5, of the first component lens 41 has a very big radius of curvature and is a substantially flat surface. Therefore, light rays emerging from the third lens 30 substantially parallel to the optical axis fall on the fourth lens 40, scarcely being refracted at the surface 44 of the first component lens 41. Thus, the effect of the surface 44 of the first component lens 41, in combination of the functions of the first lens 10, the second lens 20 and the third lens 30 to form an afocal lens system, reduces aberration caused by the projection lens 2.

Data on the projection lens 2 in an example will be explained.

FIG. 2 shows data on the projection lens 2 in an example, in which OBJ Nos. are plane numbers of surfaces of the lenses from the side of a screen toward the side of a display device. For example, the number of the aspherical surface 11 of the first lens 10 is OBJ No. 2, and the first lens 10 has lens surfaces OBJ Nos. 1 and 2. The number of the diaphragm 22 is OBJ No. 5. The numbers of the lens surfaces of the second lens 20 are OBJ Nos. 3 and 4. The numbers of the lens surfaces of the third lens 30 are OBJ Nos. 6 and 7. The numbers of the lens surfaces of the fourth lens 40, i.e., a compound lens, are OBJ Nos. 8, 9 and 10. The numbers of the lens surfaces of the fifth lens 50 are OBJ Nos. 11 and 12. The numbers of the lens surfaces of the sixth lens 60 are OBJ Nos. 13 and 14. RDYs are radii of curvature in millimeter, and THIs are thicknesses of lenses or air spaces. For example, a THI of 2.0 corresponding to OBJ No. 1 is the thickness of the first lens 10, a THI of 27.7 corresponding to OBJ No. 2 is the distance between the back end, on the side of the display device 70 of the first lens 10, and the front end, on the side of the screen 5, of the second lens 20. In FIG. 2, GLA indicated the D line refractive index and the Abbe's number of a material forming the lens. For example a GLA of 1.51680-64.2 indicates a material having a D line refractive index of 1.51680 and an Abbe's number of 64.2.

Figure 3:
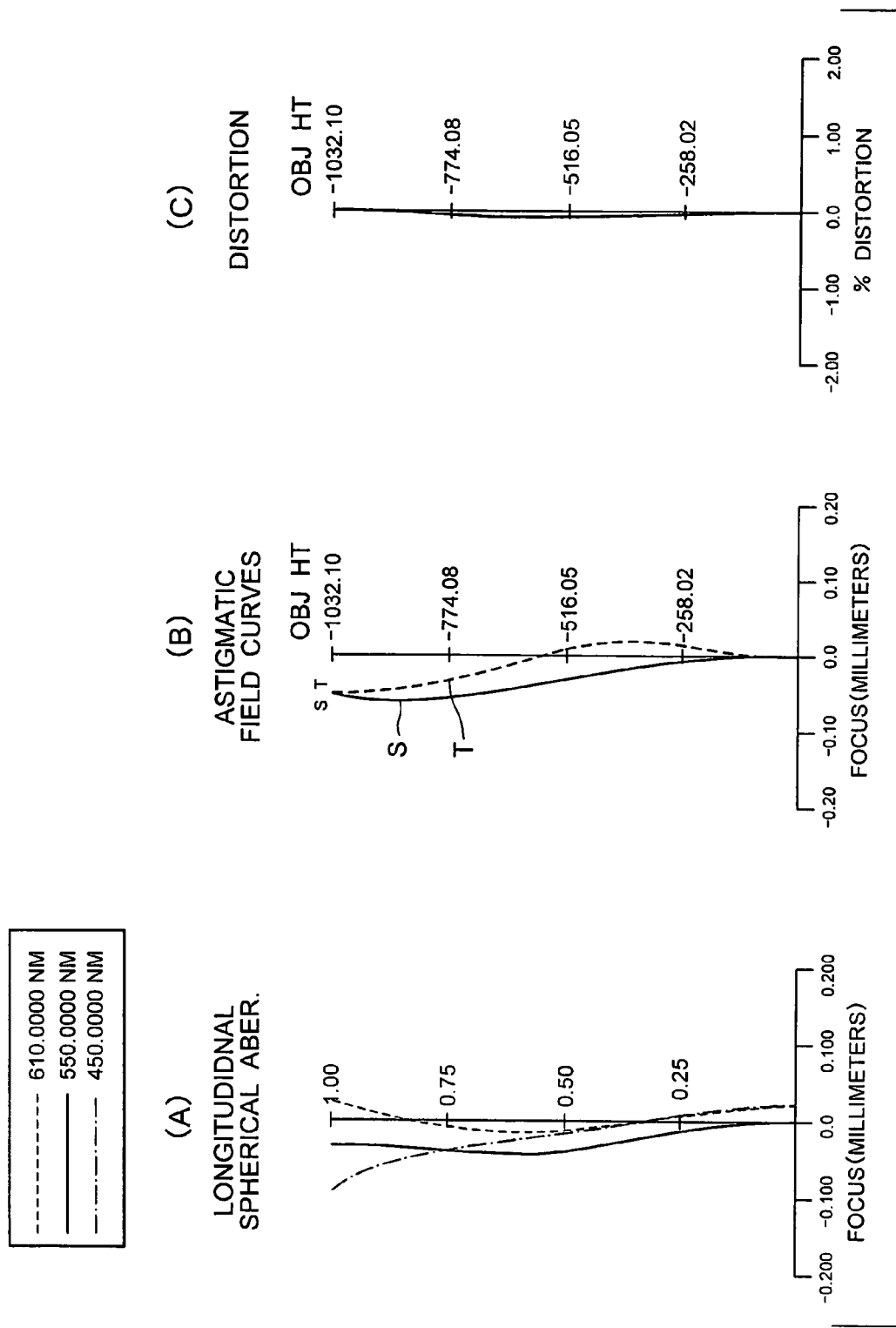
FIG. 3(A) is a diagram showing spherical aberration caused by the projection lens shown in FIG. 1.
FIG. 3(B) is a graph showing astigmatism caused by the projection lens shown in FIG. 1.
FIG. 3(C) is a diagram showing distortion caused by the projection lens shown in FIG. 1.
Figure 4:
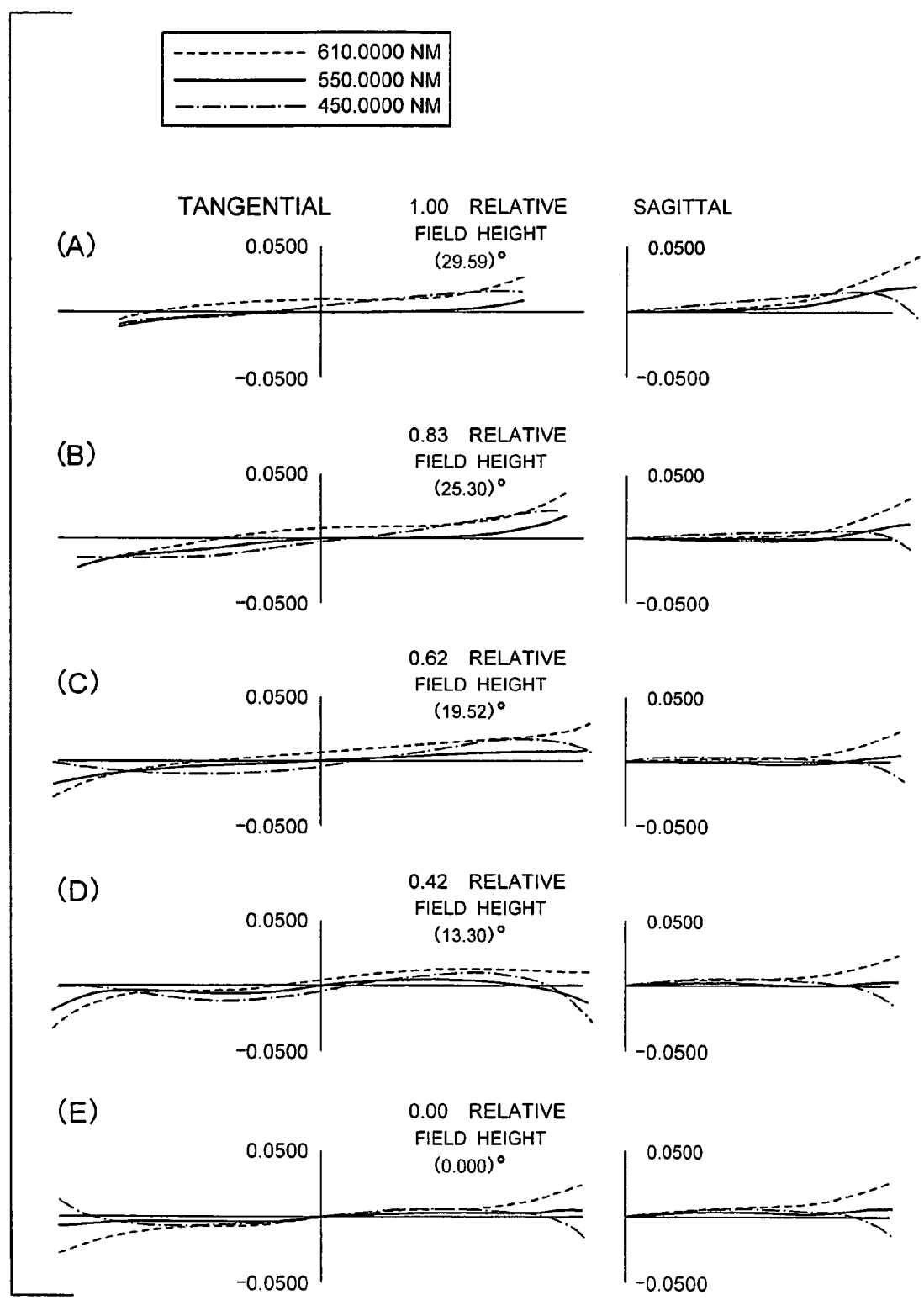
FIG. 4(A) is a diagram showing transverse aberration caused by the projection lens shown in FIG. 1 when relative field height is 1.00.
FIG. 4(B) is a diagram showing transverse aberration caused by the projection lens shown in FIG. 1 when relative field height is 0.83.
FIG. 4(C) is a diagram showing transverse aberration caused by the projection lens shown in FIG. 1 when relative field height is 0.62.
FIG. 4(D) is a diagram showing transverse aberration caused by the projection lens shown in FIG. 1 when relative field height is 0.42.
FIG. 4(E) is a diagram showing transverse aberration caused by the projection lens shown in FIG. 1 when relative field height is 0.00.

FIGS. 3 and 4 are diagrams showing the aberration curves of the projection lens 2. FIGS. 3(A), 3(B) and 3(C) show a spherical aberration curve, an astigmatic field curvature, and a distortion curve, respectively. In FIG. 3(B), curves S and T show astigmatisms with respect to a sagittal image surface and a tangential image surface, respectively. FIGS. 4(A), 4(B), 4(C), 4(D) and 4(E) show transverse aberrations for relative field heights of 1.00, 0.83, 0.62, 0.42 and 0.00, respectively. As obvious from FIGS. 3 and 4, the projection lens 2 of the present invention has a high aberration-reducing characteristic.

The respective aspheric shapes of the surface 11 of the first lens 10, and the surface 43 of the second component lens 42 are expressed by Expression (1). Values of the coefficient R of Expression (1) are the radii of curvature (RDY) corresponding to OBJ Nos. 2 and 10, and values of K, A, B, C and D are those included in sections corresponding to OBJ Nos. 2 and 10. The respective aspherical surfaces 11 and 43 of the first lens 10 and the second component lens 42 can be formed by coating spherical surfaces of glass lenses with films of a resin or the like.

In this projection lens 2, $L_{2\text{-}4}=29.7$ mm, $L_{23}=11.6$ mm, and hence $L_{23}/L_{2\text{-}4}=0.39 \approx 0.4$. Thus, the projection lens 2 meets the condition: $0.3<L_{23}/L_{2\text{-}4}<0.5$.

In this projection lens, $f_{1\text{-}2}=28.8$ mm, $f_3=-29.9$ mm, and hence $f_{1\text{-}2}/f_3=-0.96 \approx -1$. Thus, the projection lens 2 meets the condition: $-1.5<f_{1\text{-}2}/f_3<-0.8$.

The front surface 44 of the first component lens 41 has a very big radius of curvature of -97865.717 mm. thus, the surface 44 is substantially a flat surface.

The projection lens 2 has an f-number of 1.5 and a back focal distance of 33.3 mm.

Thus, the projection lens 2 embodying the present invention comprises the six lenses, has a small f-number and a high aberration reducing characteristic, is compact, light-weight and inexpensive. The projection lens 2 is suitable for use on a LCD projector.

Since the surface 11 of the first lens 10, and the surface 43 of the fourth lens 40 are aspherical, optical aberrations including distortion, coma and astigmatism, and excluding chromatic aberration can be reduced and thereby images of high definition can be formed.

Since the surface 43 of the fourth lens 40 is aspherical, excessive load is not placed on the fifth lens 50 to make the projection lens 2 substantially telecentric without causing aberrations by the fifth lens 50.

The projection lens 2 having a small f-number for the number of the lenses can be obtained by interposing the third lens 30 having a proper refracting power between the second lens 20 and the fourth lens 40 and properly determining the positional relation between the second lens 20, the third lens 30 and the fourth lens 40 even though the effective diameters of the first lens 10 and the fourth lens 40 are limited.

Since the projection lens 2 meets the condition: $0.3<L_{23}/L_{2\text{-}4}<0.5$, the projection lens 2 has a long back focal distance, the power of the third lens 30 can be limited so that aberration is within an allowable range, and the projection lens 2 has a small f-number even though the effective diameter of the fourth lens 40 is limited.

Since the projection lens 2 meets the condition: $-1.5<f_{1\text{-}2}/f_3<-0.8$, the set of the first lens 10 and the second lens 20, and the third lens 30 can form an afocal lens system, the load for aberration correction on the fourth lens 40 can be reduced, and hence the projection lens 2 has a high aberration reducing characteristic.

Since the surface 44 of the first component lens 41 has a very big radius of curvature and is substantially flat, light rays emerging from the third lens 30 substantially parallel to the optical axis are diffracted scarcely at the surface 44 of the first component lens 41 before falling on the fourth lens 40, which reduces aberrations caused by the projection lens 2.

The first lens 10, the second lens 20, the third lens 30 and the fifth lens 50 are single lenses. The term, "single lens" is used to denote substantially single lenses including single lenses having surfaces coated with thin films.

An optical projector 1 in a preferred embodiment according to the present invention provided with the projection lens 2 embodying the present invention will be described with reference to FIG. 6.

The optical projector 1 has an image-forming unit 3 for forming color images, and the projection lens 2. The image-forming unit 3 includes three liquid crystal displays, and a synthesizing prism 60 for synthesizing three color images formed by the three liquid crystal displays. In FIG. 6, the three liquid crystal displays are represented by a single display device (image plane) typically indicated by a line 70, and the three liquid crystal displays are omitted. An image formed by synthesizing three images formed by the three liquid crystal displays by the synthesizing prism 60 is projected through the projection lens 2 on a screen 5. Since the projection lens 2 is telecentric in a direction from the display device 70 toward the screen 5, the image can be clearly projected on the screen 5 without being affected by the dependence on angle of the picture quality of the images formed by the liquid crystal displays the projection lens 2 has a long back focal distance and hence the synthesizing prism 60 can be disposed between the projection lens 2 and the display device 70.

The image forming unit 3 may include optical modulators, such as devices having micromirrors serving as pixels, films or slides instead of the liquid crystal displays.

The optical projector 1 provided with the projection lens 2 is capable of projecting images in a high picture quality on the screen 5.

As apparent from the foregoing description, according to the present invention, the projection lens has simple construction including practically six lenses, is capable of forming images with small aberrations and has a small f-number. The optical projector provided with the projection lens is capable of projecting images of a high picture quality on the screen Although the invention has been described in its preferred embodiments with a certain degree f particularity, obviously many changes and variations are possible therein. It is therefore to be understood that the present invention may be practiced otherwise than as specifically described herein without departing from the scope and spirit thereof.

What is claimed is:

1. A fixed-focus projection lens, consisting of:
    six lenses, the six lenses including
        a single lens having negative refracting power serving as a first lens,
        a single lens having positive refracting power serving as a second lens,
        a single lens having negative refracting power serving as a third lens,
        a compound lens having positive refracting power, consisting of a first component lens having negative refracting power and a second component lens having positive refracting power and cemented to the first component lens, and serving as a fourth lens, and
        a single lens having positive refracting power serving as a fifth lens,
    the six lenses being arranged in that order from a side of a screen toward a display device;
    wherein a part of the projection lens on the side of the display device is substantially telecentric, and a surface, on the side of the display device, of the first lens, and a surface, on the side of the display device, of the second component lens of the fourth lens are aspherical,
    wherein $0.3 < L_{23}/L_{2-4} < 0.5$, where $L_{2-4}$ is the distance between an end, on the side of the screen, of the second lens and an end, on the side of the display device, of the fourth lens, and $L_{23}$ is the distance between an end, on the side of the display device, of the second lens and an end, on the side of the screen, of the third lens, and
    wherein the first, the second and the third lens meet a condition: $-1.5 < f_{1-2}/f_3 < -0.8$, where $f_{1-2}$ is the synthetic focal length of the first and the second lens, and $f_3$ is the focal length of the third lens.

2. The fixed-focus projection lens according to claim 1, wherein the first, the second and the third lens have refractive powers such that light rays traveling from the side of the screen and falling on the first lens substantially parallel to an optical axis emerge from the third lens substantially parallel to the optical axis.

3. An optical projector comprising:
    an image forming means for forming an image; and
    the fixed-focus projection lens according to claim 2 for projecting the image formed by the image forming means.

4. The fixed-focus projection lens according to claim 1, wherein a surface, on the side of the screen, of the first component lens of the fourth lens is substantially flat.

5. An optical projector comprising:
    an image forming means for forming an image; and
    the fixed-focus projection lens according to claim 4 for projecting the image formed by the image forming means.

6. An optical projector comprising:
    an image forming means for forming an image; and
    the fixed-focus projection lens according to claim 1 for projecting the image formed by the image forming means.

* * * * *